Oct. 3, 1967 R. W. BEMMANN ETAL 3,344,513
PUMP-MOTOR ASSEMBLY METHOD
Original Filed June 11, 1962 2 Sheets-Sheet 1

INVENTORS
Richard W. Bemmann
Werner F. Schultz
BY
Albert S. Reutter
THEIR ATTORNEY Oct. 3, 1967 R. W. BEMMANN ETAL 3,344,513
PUMP-MOTOR ASSEMBLY METHOD
Original Filed June 11, 1962 2 Sheets-Sheet 2

INVENTORS
Richard W. Bemmann
Werner F. Schultz
BY
THEIR ATTORNEY

—

United States Patent Office 3,344,513
Patented Oct. 3, 1967

3,344,513
PUMP-MOTOR ASSEMBLY METHOD
Richard W. Bemmann and Werner F. Schultz, Flint, Mich., assignors to General Motors Corporation, Detroit, Mich., a corporation of Delaware
Original application June 11, 1962, Ser. No. 201,418, now Patent No. 3,180,267, dated Apr. 27, 1965. Divided and this application Feb. 27, 1964, Ser. No. 347,891
1 Claim. (Cl. 29—596)

This is a divisional application of parent disclosure Ser. No. 201,418, Bemmann et al., filed June 11, 1962, now Patent 3,180,267, Bemmann et al., issued Apr. 27, 1965, and belonging to the assignee of the present invention.

This invention relates to structural arrangement as well as method of assembly of an electrically energizable device for effecting movement of a fluid medium such as liquid fuel and the like.

An object of this invention is to provide a new and improved assembly of a pump and motor structure accomplished by temporary use of a special tool-like member withdrawn once proper positioning for journalling of components is attained simultaneously to avoid concentricity and alignment problems as to motor component air gap as well as pump-motor bearing means.

Another object of this invention is to provide a method of attaining and retaining correct alignment of essential parts of a combination electric motor and fluid pump means in sequence including stator positioning, engaging both stator bore and motor-pump housing primary bearing with an axially unitary special tool-like mandrel member having predetermined portions of differing diameters therewith in properly aligned positioning, filling space remaining between the stator and housing as well as the tool-like member with a potting compound such as a plastic resin to set with the stator substantially embedded therein through simultaneously properly positioning the stator bore as to the primary bearing of the housing as well as a secondary bearing axially spaced therefrom due to forming by the potting compound, removing the tool-like member axially in one direction out of the predetermined positioning thereof, and journalling pump-motor rotor means on a common axis determined by intermediate use of the tool-like member prior to the removing thereof.

Another object of this invention is to provide specific improvement of a submersible electric-motor-actuated fuel pump assembly so as to control fully the concentricity of the stator air gap and inside diameter of a pair of housing bearing locations for a shaft-mounted rotor means journalled therewith by a step of simultaneously aligning the stator air gap and pair of housing bearing locations defined by potting means such as plastic resin, epoxy compound, or other setting compound filled to surround necessary components as well as a special axially unitary tool-like removable-mandrel member having at least three integral portions each of differing and progressively larger diameters defining opposite bearing locations and stator air-gap therebetween in proper coaxial and concentric relationship to each other.

A further object of this invention is to provide a submersible gasoline pump and electric motor structure utilizing a printed circuit end plate means for energizing connections along one side of a unitary pump-motor housing filled with potting material having concentricity control of opposite rotor-journalling bearing locations as well as stator air gap determined by temporary insertion of a removable-mandrel member with integral coaxially-fixed angular portions of differing diameters without need for separate bearing and stator air gap alignments.

Another object of this invention is to provide a housing means for use with a combined fuel pump and electric motor unit including no self-aligning socket-like bearing means but rather, having axially and concentrically aligned motor housing portion, pump volute housing portion and bearing support portions all integrally joined with all fastening achieved by means of interference fits and potting compound preformed into predetermined differing internal diameters by use of a removable-mandrel member of unitary axially spaced three concentric diameter portions which define opposite bearing locations as well as intermediate stator air gap subject to optional lubricating passage formation as well as bleeding facility so as to bleed air and prime the pump for starting operation thereof.

Further objects and advantages of the present invention will be apparent from the following description, reference being had to the accompanying drawings wherein preferred embodiments of the present invention are clearly shown.

In the drawings:

FIGURE 1 provides an end view of assembly of submersible gasoline pump and electric motor structure utilizing a printed circuit end plate means and features in accordance with the present invention.

Recent developments have been made to provide fewer parts or components subject to wear and electrical deterioration in pump-motor structures. In some instances, by use of semi-conductor devices it has been possible to eliminate electrical brushes for the motor component of such structures with the result that the rotor shaft and bearings are generally the only wearing parts. Once such wear occurs, the rotor body can strike the stator portion and thereby stop rotor rotation and resulting in failure of the device to perform its function. In most motor assemblies, the rotor is located in the air gap by means of mechanical supports adjacent to opposite ends of a stator and each containing a self-aligning bearing means. Inside diameters of such bearings are centrally located as to the air gap by securing such supports relative to precisely machined apertures or holes in stator laminations. This type of assembly, particularly for pump-motor structures, can cause tolerance problems which result in misalignment of the bearing means as to the stator-rotor air gap.

Thus, the present invention provides a unique method for electric motor-pump assembly so as to control fully the concentricity of the stator-rotor air gap and the inside diameter for opposite bearing means that journal the rotor shaft. Features of the present invention can be used in the construction of a submersible electric fuel pump in which the motor housing, pump volute housing and bearing means supports are all in the same piece. No self-aligning bearings are used and all fastening is achieved by means of interference fits and potting compound. Electrical connections for the motor portion can be made by means of a printed circuit board and rectangular conductor harness means of a type disclosed in an application Ser. No. 141,483, filed Sept. 28, 1961, and belonging to the assignee of the present invention. As to circuit connections for a pump-motor structure including semi-conductor devices, reference can be made to an application Ser. No. 70,506, Adair, filed Nov. 18, 1960, now Patent 3,171,072, Adair, issued Feb. 23, 1965, and also belonging to the assignee of the present invention. A patent, 2,353,958, Lauer, issued July 4, 1944, to the assignee of the present invention illustrates environment in which such a pump-motor structure can be utilized and also illustrates use of self-aligning bearings in a multi-part assembly of the type in which improvement is made.

Figure 1:
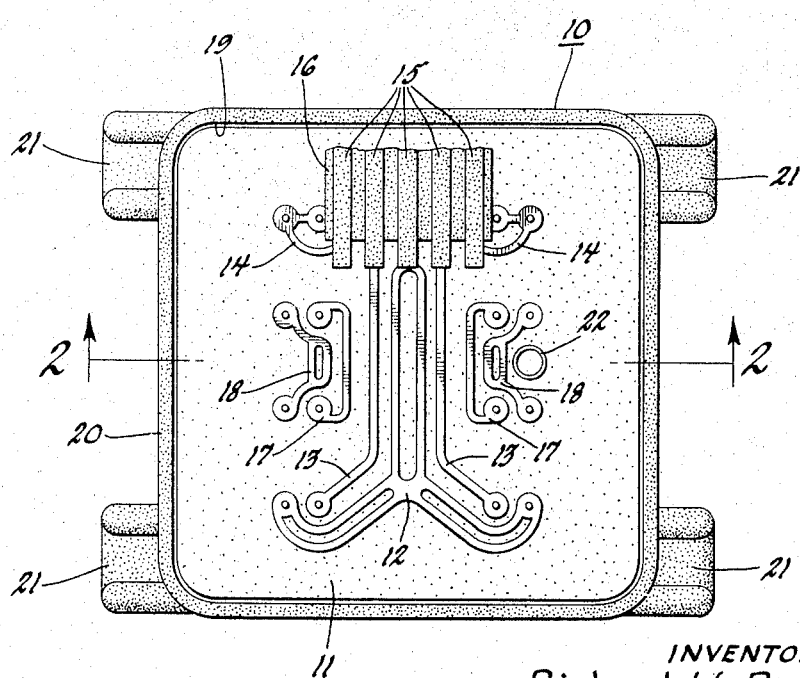

FIGURE 1 illustrates a pump-motor structure generally indicated by numeral 10 and including a panel or board of insulating material as an end plate means 11 having conductor or printed circuit portions 12, 13 and 14 connected to flat conductors such as 15 carried in insulating material 16 of a flat harness means or rectangular conductor harness as disclosed in the previously noted copending patent application belonging to the assignee of the present invention. The board or panel of insulating material 11 can also provide printed circuit-type interconnections such as indicated by numerals 17 and 18 and adapted for energization of predetermined conductors or coil wire of a wound stator portion of pump-motor structure. The board or panel of insulating material 11 can be bonded or press-fitted into an opening 19 of a substantially square or rectangular shaped body portion or housing 20 of suitable material having integral outwardly-extending slotted lugs or mounting projections 21 as well as an integral pump output conduit portion 22 relative to which a pipe or tubing can be attached to extend longitudinally or axially as shown. The outward projections 21 can fit complementary to a suitable support such that fluid medium such as fuel to be transferred from a storage tank to a combustion engine can be caused to pass relative to structural components of the device having features in accordance with the present invention. It is to be understood that electrical energization can be accomplished by connections other than a printed circuit board though use of the printed circuit board does facilitate assembly and reduce cost. Use of a flat harness means and printed circuit board in combination with an electrically operable pump-motor structure can result in a compact assembly requiring considerably less space and servicing. The flat conductors 15 can be soldered or otherwise suitably joined to predetermined printed circuit portions or conductors carried by the panel or board of insulating material 11 to which predetermined stator wire terminations can be inserted in predetermined spaced relation.

Figure 2:
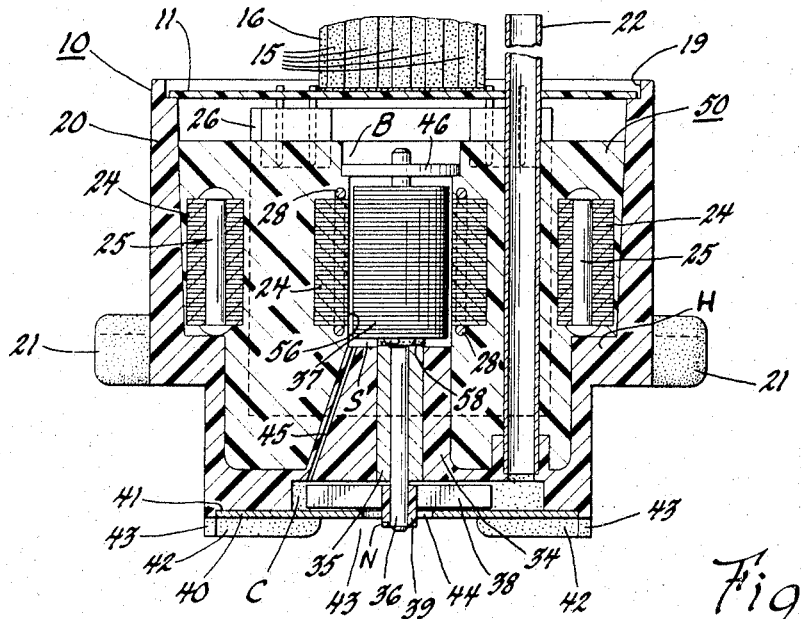
FIGURE 2 is a cross-sectioned elevational view taken along line 2—2 in FIGURE 1.
Figures 3, 4:
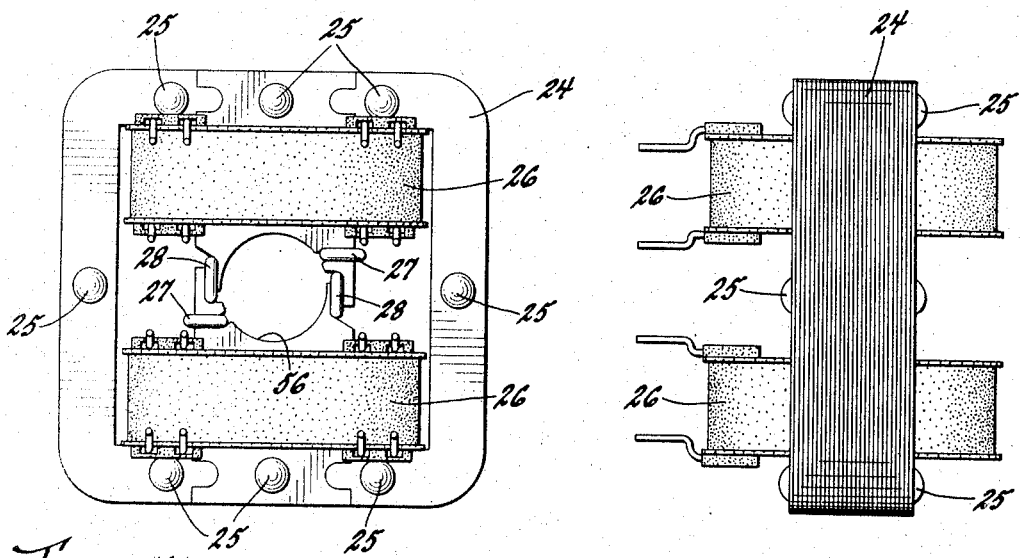
FIGURE 3 is a side view of an electrical motor stator portion for use in the assembly of FIGURES 1 and 2.
FIGURE 4 is a plan view of the stator portion of FIGURE 3.

FIGURES 2, 3 and 4 illustrate in further detail a wound stator means having a magnetic core formed by a plurality of metal laminations 24 is complementary segments to be located in spaced relation to one side of a laterally-extending intermediate housing portion H. The laminations are aligned and joined by suitable fastening means such as screws or rivets 25 extending through suitable apertures of the lamination assembly. These lamination segments as assembled can dovetail as apparent in FIGURE 4 such that opposite E-shaped or C-shaped segments can be fitted to each other to complement the conduit portion 22 extending axially therethrough to an upper side of the board 11 as well as providing openings therebetween for placement and predetermined positioning of insulated stator winding portions 26 having suitable lead wires extending therefrom and adapted for electrical energization by way of the printed circuit portions on the board or panel of insulating material 11 as shown in FIGURES 1 and 2. FIGURES 2 and 4 illustrate the stator core as provided with shading pole portions utilizing shading coils or rings 27 and 28 in a well-known manner.

Figure 5:
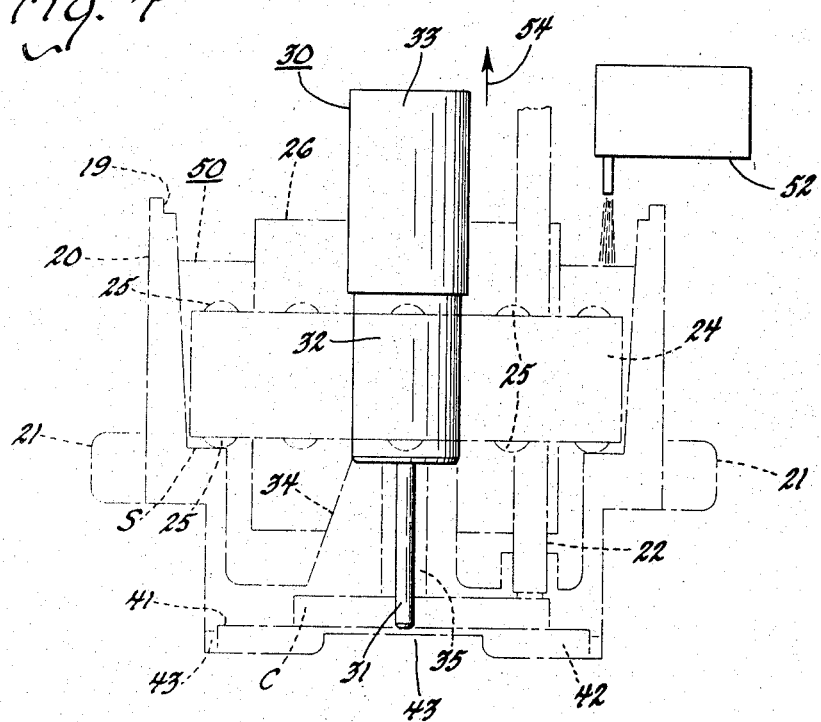
FIGURE 5 shows temporary use of an axially unitary special tool-like removable-mandrel member in alignment procedure to house components of the assembly in accordance with the present invention.

FIGURE 5 illustrates a tool-like removable-mandrel member generally indicated by numeral 30 having a first small diameter portion 31 as well as a second or intermediate diameter portion 32 and an integral larger diameter portion 33 axially spaced relative to each other in predetermined and proper alignment. The housing 20 illustrated in FIGURE 2 can include a substantially centrally located hub portion 34 into which a cylindrical or plain bearing means 35 is press-fitted and relative to which a shaft 36 of a laminated rotor 37 of the electric motor as well as an impeller 38 having radially outwardly extending blades and a central hub 39 are adapted to be carried. A series of notches such as N indicated in FIGURE 2 can be provided radially on a lower end of impeller hub 39 to be effective in breaking up and dispersing any air bubble tending to form at the pump inlet or intake opening thus assisting in a self-priming action. In effect, there is a single axis about which the motor rotor 37 and impeller are adapted to be journalled for rotating movement. A pump chamber portion C can be defined by a transverse bottom of the housing 20 suitably recessed and defined in part by an end plate 40 which can be press-fitted against a shoulder 41 located laterally inwardly and above corner projections 42 separated from each other though having a right-angle configuration defining lateral openings 43 through which the fluid medium such as fuel can pass to an intake opening 44 provided as a central aperture in the end plate 40. A passage 45 can interconnect the chamber C and a space S in which the motor rotor 37 is adapted to move. The space S has a diameter larger than either internal or external diameter of the sleeve-like bearing means 35 yet smaller than a diameter of a bearing portion B relative to which a secondary bearing means 46 can be press-fitted for journalling an end of the single shaft 36 in a location remote from the impeller 38. The passage 45 serves a dual purpose. Fluid medium for priming the pump portion can enter pump chamber C through the normal intake opening 44 because air otherwise trapped is allowed to escape from chamber C through the passage 45 into the space S. Conversely, the passage 45 can also permit use of the fluid medium such as a fuel or liquid gasoline or other petroleum product to be forced under pressure of the pump portion impeller 38 to pass to the space S for forced lubrication of the primary and secondary bearing means 35 and 46.

The tool-like mandrel means or multi-diameter member 30 as shown in FIGURE 5 is fitted to have the smallest diameter first portion 31 fitted to an inner periphery of the cylindrical or sleeve-like primary bearing 35 thus establishing proper axial relationship for the integral secondary or intermediate portion 32 as well as the third portion 33. The motor stator assembly, including the laminations 24 fastened to each other by rivets 25 and the like as well as the stator winding 26 therewith extending down around the hub 34, can be fitted temporarily around the intermediate portion 32 having a diameter to form the space S located concentrically inside the stator means and simultaneously the third portion 33 defines a larger diameter for a bearing portion B indicated in FIGURE 2 preformed in a unitary assembly by a plastic resin means or potting compound generally indicated by numeral 50.

This plastic resin or potting compound 50 can be poured from a suitable container or source of supply 52 indicated in FIGURE 5. The plastic resin or potting compound 50 can be permitted to cure or set while the tool-like mandrel member 30 remains in place subject to axial removing thereof in a direction of arrow 54 indicated in FIGURE 5. The axially unitary special tool-like mandrel member 30 having predetermined portions 31, 32 and 33 of differing diameters permits attaining and retaining correct alignment of essential parts of a combination electric motor and fluid pump means in sequence including stator positioning as noted, engaging both stator bore and motor-pump housing primary bearing with the first diameter portion 31 as well as filling space remaining between the stator and housing as well as the tool-like mandrel member 30 with the potting compound of material such as epoxy or other filler material curable into a single component having proper alignment of differing diameter portions to permit journalling of a pump-motor rotor means on a single shaft relative to a primary bearing means 35 axially in alignment with a secondary bearing means 46. The primary bearing means can be made of a sintered metal including bronze and polytetrafluoroethylene (Teflon) impregnated particles for a low friction bearing surface. The pump impeller 38 can have a predetermined number of outwardly extending curved arms or blades of which only two can be seen though including upwards to six such arms or blades. The end plate 40 is fastened or press-fitted along an outer periphery thereof against the shoulder 41 of the housing 20 thereby defining a volute chamber and discharge passage. Predetermined recesses or chambers of differing diameters can be formed by the single tool-like mandrel member 30 such that the primary bearing means 35 and secondary or suppressive bearing means 46 as well as the motor rotor 37 and pump impeller 38 are axially aligned simultaneously. Such simultaneous alignment can be provided for the motor means per se either with or without an additional pump portion axially adjacent thereto. The housing 20 and potting means 50 in effect become a unitary plastic casing in which the stator means including windings thereof are embedded in sealed relationship and use of self-aligning bearings and separate external fastenings for holding together the unitary piece and opposite end plates can be avoided by means of interference fits and potting compound as described. The mandrel member 30 includes three concentric diameters progressively larger such that the intermediate portion or diameter 32 fits into a cylindrical bore 56 of the stator means as indicated in FIGURE 4 subject to formation of cylindrical space S as indicated in FIGURE 2 having a predetermined diameter to define proper air gap between the magnetic core 24 and motor rotor portion 37. The smallest bottom or first diameter portion 31 of the mandrel member 30 is used to locate the stator means centrally to one side of the primary bearing means 35 relative to the inside diameter of the bore 56. It is to be understood that the relationship between the intermediate diameter portion 32 and bore 56 of the stator core is quite close such that pressing thereof to each other can be required though the cylindrical space S is defined by filling of interstices or remaining space filled with flowable potting compound which also defines the bearing shoulder B against which the secondary bearing means 46 can be press-fitted once the differing diameter portions have been formed in proper axial and concentric alignment by use of the removable mandrel member 30. The outer shell or housing 20 includes the pump volute chamber C as well as the bearing lubrication-primer tap or passage 45 as well as the lower bearing support or hub 34. During assembly, the primary bearing means 35 is pressed into the bearing support or hub 34 and then the motor stator assembly can be fitted directly onto the intermediate or central portion 32 of the mandrel member 30 subject to subsequent positioning thereof with respect to the primary bearing means 35 followed by potting in place to a height above the suppressor bearing diameter or third diameter portion 33 on the mandrel member 30. After the potting compound is cured such as by suitable heating for a predetermined time interval, the mandrel member 30 can be removed axially in the direction of arrow 54 in FIGURE 5. A suitable thrust washer 58 as indicated in FIGURE 2 can be slipped around the single shaft 36 to be located adjacent to a lower end of the motor rotor means 37 and the rotor including the shaft 36 is then inserted into position on the lower or primary bearing means 35. The pump impeller 38 is then press-fitted onto a lower end of the shaft 36 and the suppressor or secondary bearing means 46 is pressed into the potting compound as the latter defines the shoulder B and around the upper end of the shaft 36. The end plate 40 is fitted against the bottom of the shell or housing 20 to define the pump portion and the printed circuit board 11 is placed on the top to provide necessary motor connections.

Among the advantages to be noted for the present invention are both structural features as well as a procedure or method including complete control of motor air gap dimensions without use of external securing parts other than potting compound. A pump housing portion becomes an integral part of the motor assembly. The passage 45 provides a bleeding facility to permit bleeding of air and pump priming for starting as well as a conduit for furnishing the bearing means with lubricating medium such as the fuel being pumped once the priming for starting is completed. An elongated cylindrical sleeve-like lower or primary bearing means 35 can be provided to carry the main load and weight of the motor rotor and shaft and a relatively short upper or secondary bearing means 46 can serve as an oscillation suppressor. Furthermore, the motor connections for electrical energization thereof can be made by means of a printed circuit board and flat harness means in combination therewith. The pump volute chamber is separated from the open end of the bore for the motor rotor and the shaft 36 is journalled for rotation by opposite bearing means having predetermined alignment relative to each other. The pump impeller 38 and motor rotor are separate from each other though carried by a single shaft. The bore of the stator means is also the bore of the motor rotor opening by virtue of a unique method of assembly. The mandrel member is withdrawn and does not form a permanent part of the motor assembly. The potting compound serves to hold the stator means in correct position in relation to the bearing means and the potting compound also provides the means of support and positioning of the secondary bearing adjacent to the upper end of the shaft.

While the embodiments of the present invention as herein disclosed constitute preferred forms, it is to be understood that other forms might be adopted.

What is claimed is as follows:

A method for attaining and retaining correct alignment of essential parts of a combination electric motor and fuel pump structure relative to a shell-like housing member having a hub-like bottom portion which accommodates, and rigidly supports the motor rotor primary bearing comprising the steps of, positioning a wound stator member axially upon a lateral annular shoulder located intermediate the ends of the inside of said shell-like housing member, axially inserting a special mandrel member, having small and intermediate diameter portions which snugly engage the bores of said primary bearing and said stator members, respectively, and a large diameter portion, centrally through and into engagement with said stator member bore and said primary bearing bore to align the bores of said stator member and said primary bearing upon a common axis, vertically filling the remaining space within said shell-like housing member with a potting compound to embed said stator member and partially surround said large diameter portion of said mandrel member, curing said potting compound, axially withdrawing said mandrel member, inserting the shaft of the motor rotor into said primary bearing which journals said rotor on said common axis and press fitting the motor rotor secondary bearing into the recess produced by the largest diameter portion of said mandrel member in said potting compound.

(References on following page)

References Cited

UNITED STATES PATENTS

| | | | |
|---|---|---|---|
| 2,668,925 | 2/1954 | Bloser | 29—155.5 |
| 2,818,518 | 12/1957 | Phaneuf et al. | 310—237 X |
| 2,920,574 | 1/1960 | Sampietro | 103—87 |
| 2,950,401 | 8/1960 | Evans et al. | 310—44 |
| 2,967,346 | 1/1961 | McMaster et al. | 29—155.5 |
| 3,002,261 | 10/1961 | Avila et al. | 29—155.5 |
| 3,080,615 | 3/1963 | Carlson et al. | 29—155.54 |

FOREIGN PATENTS

| | | |
|---|---|---|
| 196,494 | 8/1957 | Germany. |
| 691,446 | 7/1951 | Great Britain. |

JOHN F. CAMPBELL, *Primary Examiner.*

R. W. CHURCH, *Assistant Examiner.*